(No Model.) 3 Sheets—Sheet 1.
P. C. LAWLESS.
FLEXIBLE PIPING FOR PNEUMATIC BRAKES, &c.
No. 445,250. Patented Jan. 27, 1891.
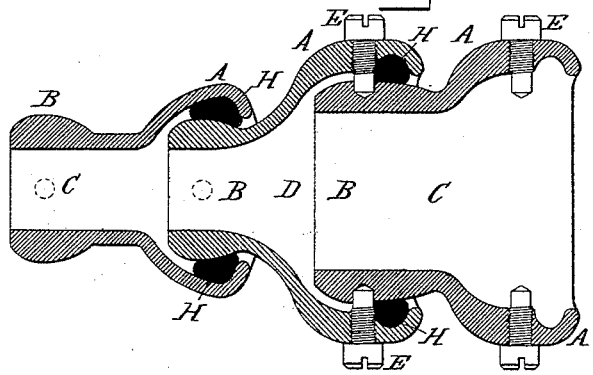
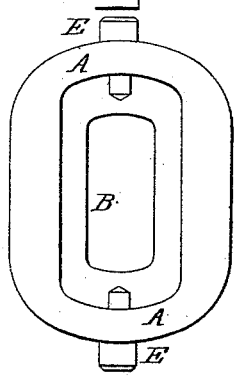
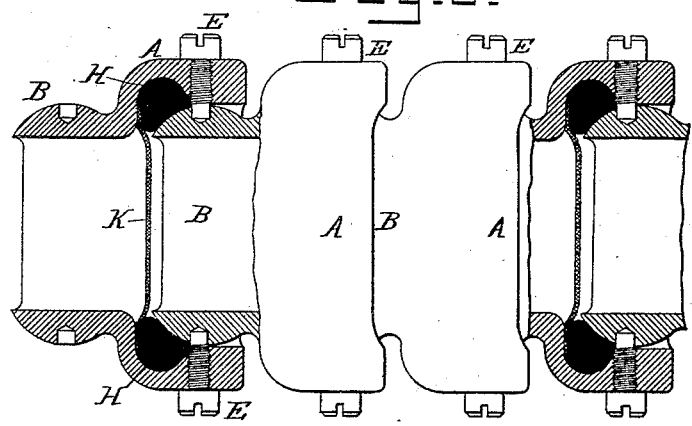
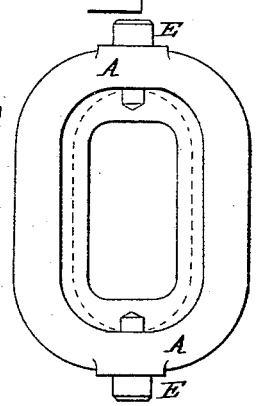
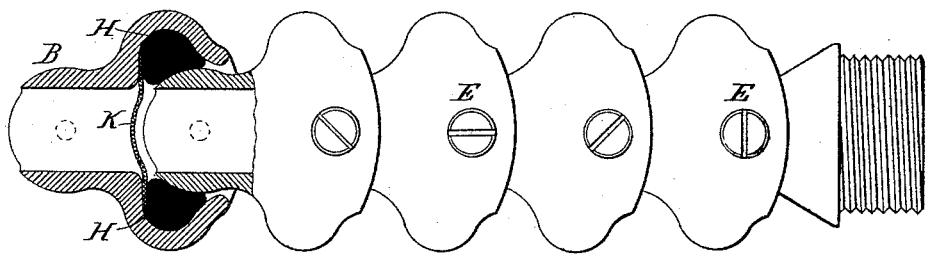
WITNESSES:
George Baumann
John Revell
INVENTOR
Philip C. Lawless
BY Howson and Howson
his ATTORNEYS.

(No Model.) 3 Sheets—Sheet 2.
P. C. LAWLESS.
FLEXIBLE PIPING FOR PNEUMATIC BRAKES, &c.
No. 445,250. Patented Jan. 27, 1891.
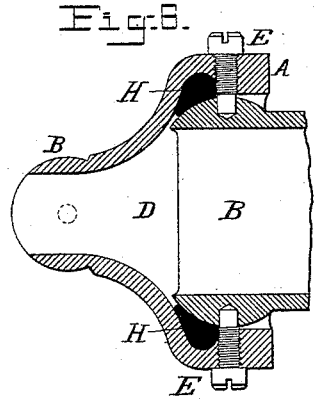
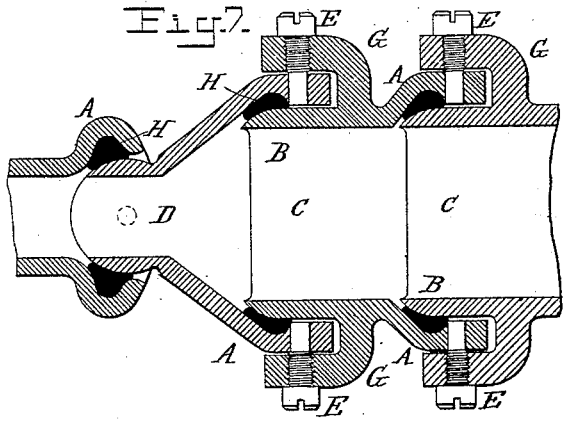
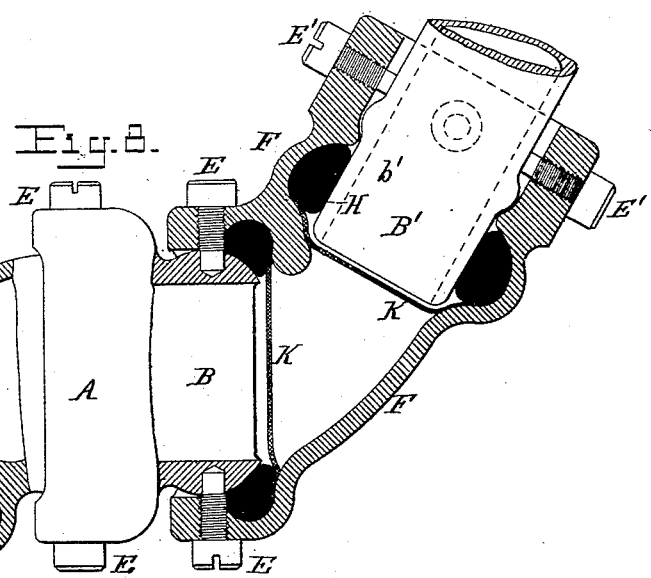
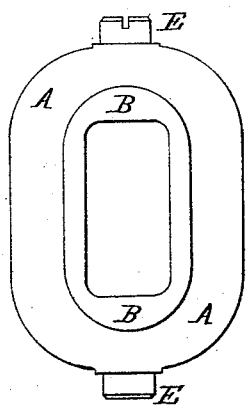
WITNESSES:
George Baumann
John Revell
INVENTOR
Philip C. Lawless
BY
Howson and Howson
his ATTORNEYS (No Model.) 3 Sheets—Sheet 3.
P. C. LAWLESS.
FLEXIBLE PIPING FOR PNEUMATIC BRAKES, &c.
No. 445,250. Patented Jan. 27, 1891.
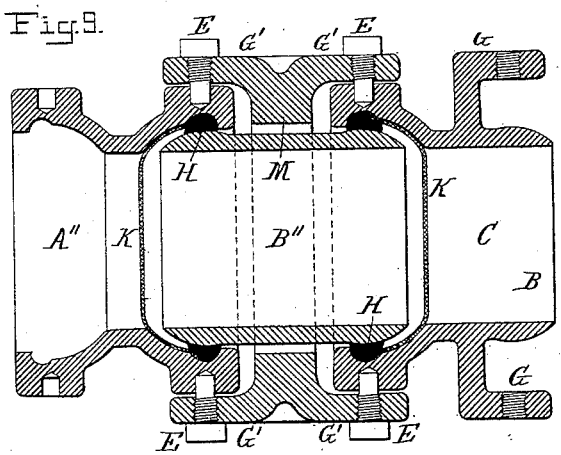
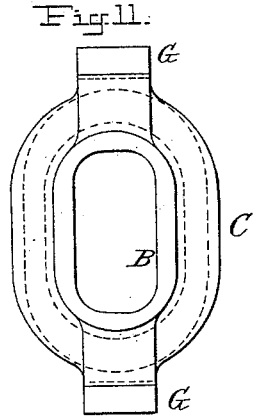
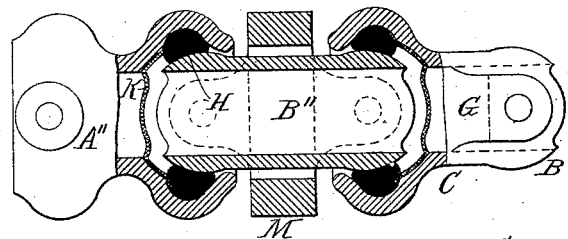
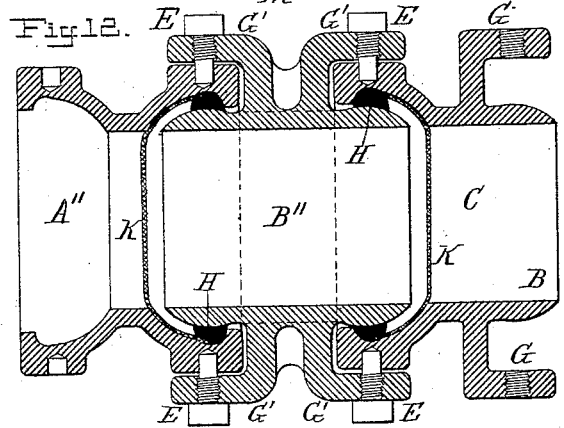
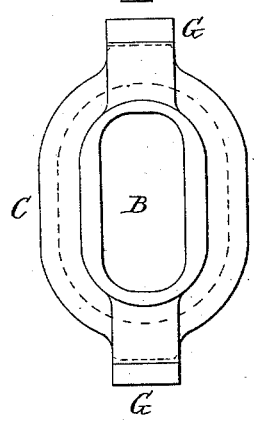
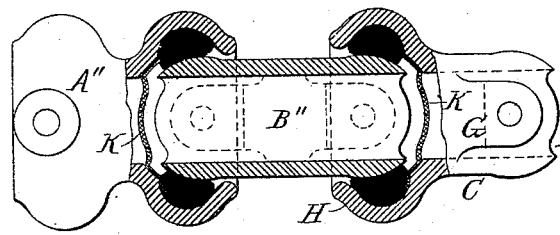
WITNESSES:
George Baumann
John Revell
INVENTOR
Philip C. Lawless
BY
Howson and Howson
his ATTORNEYS.

UNITED STATES PATENT OFFICE.

PHILIP C. LAWLESS, OF ALLEGHENY, PENNSYLVANIA.

FLEXIBLE PIPING FOR PNEUMATIC BRAKES, &c.

SPECIFICATION forming part of Letters Patent No. 445,250, dated January 27, 1891.

Application filed April 9, 1890. Serial No. 347,213. (No model.) Patented in England February 24, 1886, No. 2,661, and February 14, 1888, No. 2,197.

*To all whom it may concern:*

Be it known that I, PHILIP C. LAWLESS, a subject of the Queen of Great Britain and Ireland, and at present residing in Allegheny, Allegheny county, Pennsylvania, have invented Improvements in Flexible Piping for Pneumatic Brakes and other Apparatus, (for which I have obtained British Patent No. 2,661, dated February 24, 1886, and British Patent No. 2,197, dated February 14, 1888,) of which the following is a specification.

The object of my invention is to construct an improved flexible piping suitable for pneumatic-brake apparatus and for other apparatus requiring flexible piping for transmitting fluid.

My improved piping is made up of short tube lengths of steel or iron or other suitable metal coupled together by joints acting like hinges. At each joint there is a socket at the end of one tube length, while the end of the other tube length is made with a hollow journal to work inside of the socket. These socket ends and journal ends are connected by pivot-pins, so as to be transversely hinged together, and a packing of suitable material is inserted between the socket and the journal, which latter is made materially smaller than the inside of the socket, as explained hereinafter. A wire-gauze or other permeable diaphragm or lining may be combined with the packing. The tube lengths may be made each with a socket at one end and a journal at the other end, or there may be lengths with sockets at both ends and other lengths with journals at both ends.

In the accompanying drawings, Figure 1 is a longitudinal section showing one form of my flexible piping. Fig. 2 is an elevation of the socket end of one of the tube lengths. Fig. 2ᵃ is an elevation of the journal end of a tube length. Figs. 3 and 4 are a sectional plan and an end elevation, respectively, of another form of my flexible piping. Fig. 5 is a side elevation, partly corresponding to Fig. 3. Figs. 6 and 7 show modifications of parts of the flexible piping. Fig. 8 is a view partly in section and illustrates the manner of connecting the flexible piping to fixed pipe-nozzles. Figs. 9, 10, and 11 are views of a modification, and Figs. 12, 13, and 14 are corresponding views of another modification.

Each short tube length is formed with a larger or socket end A and with a smaller or journal end B, both being preferably of an oblong form in cross-section, as seen in Figs. 2 and 2ᵃ. Each tube length may have its ends with their larger transverse dimensions in the same plane, as shown in Figs. 2, 3, 4, and 5, and in the tube lengths C in Figs. 1 and 7, or one or more of the tube lengths may be made with the longer transverse dimensions of its ends at right or other angles, as shown at D in Figs. 1, 6, and 7.

The journal end B of each tube length is shaped like a portion of a cylinder with rounded ends, the axis of the cylinder coinciding with the longer transverse dimension of the tube length at that part, and each journal end B is externally smaller than the mouth of the socket, so that the journal end can be directly entered into the socket end A of the next tube length, while the series of tube lengths are articulated or jointed together by pivot-pins E, which may be screwed through the socket ends into pivot-holes in the journal ends, as shown in Figs. 1 to 6, or through small horns G, formed on the journal ends into pivot-holes in the socket ends, as shown in Fig. 7.

In the construction shown at D in Figs. 1, 6, and 7 the pivoting-axes at opposite ends of the tube length are at or approximately at right angles to each other, and by this means I am enabled to provide flexible metallic piping or tubing with gimbal-joints, giving flexibility in all directions.

The socket ends A are formed with internal grooves to hold rings or bands H, of rubber, leather, or other suitable packing material, these rings or bands H being shown in the several figures in black section. The grooves for the packing rings or bands H may be made to pass round the outer sides of the pivot-pins E, as shown in Fig. 1; but I believe it to be better to make the grooves pass round the inner sides of the pivot-pins E, as shown in Figs. 3 to 7; but in any case the grooves should at the sides of each socket be as near as conveniently possible to the transverse plane passing through the axis of the joint. When vulcanized rubber is used as the packing material, it is by preference prepared by being steeped for some time in oil, which renders it not only less liable to harden, but also makes it act with less friction.

In all cases, it will be observed, the journal end is not only smaller than the mouth of the socket for joining the lengths together, but is materially smaller than the interior of the socket in which it is contained, and this is for a double purpose—namely, first, that there may be no such liability of the parts rusting together, as is the case with fitted ball-and-socket joints, and machining of the parts to fit is avoided, and, second, that the intermediate packing, which is of a more or less yielding and resilient character, may allow a certain amount of elasticity to a bending strain on the flexible piping, and yet by the resiliency of the packing tend to bring the parts back to their proper relative positions when relieved again from strain. The body parts connecting the socket and journal ends A B may be of any desired length; but when made short a certain amount of flexibility is obtained with a comparatively small angular movement at each joint.

With the object of insuring fluid-tightness between the socket ends B, I introduce between each packing ring or band H and the groove in the socket at the side of the ring subjected to the greater pressure a diaphragm or lining of a permeable material, such as wire-gauze. This permeable lining, which is shown at K in Figs. 3, 5, and 8 as arranged for the case in which the pressure is greater inside the piping, allows the pressure to act on a part of the outer surface of the ring or band H, so as to press the ring or band firmly upon the journal end B.

As I have already said, some of the tube lengths may be made with sockets at both ends and others with journals or spigots at both ends. Thus in the modification shown in Figs. 9, 10, and 11 one tube length A″ is formed with sockets at both ends, while another C is formed on the construction shown in Fig. 7. These are connected by a spigot-piece B″, having spigots or journals at both ends and fitting into the sockets of the other tube lengths with the packing and wire-gauze diaphragms before referred to. The tube lengths A″ and C are connected by a separate link M in the form of a ring embracing the spigot-piece and provided with lugs or projections G′, with pivot-pins E entering suitable openings in the faucet ends of the adjoining tube lengths. These connecting lugs or projections G′, instead of being formed on a separate ring M, may be formed on the spigot-piece B″ itself, as shown in Figs. 12 and 13.

In connecting up my improved piping to a fixed pipe-nozzle I fit a journal or faucet end B of the pipe length into a corresponding socket on a faucet or spigot piece F, which may be of the curved form shown in Fig. 8 or may be straight. The nozzle B′ of the fixed piping fits into the circular socket at the other end of the faucet-piece F and is retained by screws E′, screwed through lugs formed in the faucet-piece F, so as to engage behind a bead b′ on the nozzle B′. An internal groove is formed inside of the faucet, and in this groove is placed a rubber or other packing-ring H, of suitable shape and size to make a tight joint with the nozzle B′ of the fixed pipe. Wire-gauze K is, as before described, inserted between the packing ring or band and the surface of the groove, so as to allow the pressure to tend to tighten the joint. If a further curve is to be given to the flexible piping, one of the pipe lengths, as shown at A′ B′, may have the curved shape illustrated in Fig. 8.

I claim as my invention—

1. The improved flexible piping consisting of a number of short tube lengths with socket ends and journal ends, the journals being externally smaller than the mouths of their sockets and also materially smaller than the insides of their sockets, connecting-pivots hinging the lengths together, and yielding packing between the journals and sockets, all substantially as and for the purpose described.

2. The improved flexible piping consisting of a number of short tube lengths with socket ends and journal ends, the journals being externally smaller than the mouths of their sockets and also materially smaller than the insides of their sockets, connecting-pivots hinging the lengths together, and resilient yielding packing between the journals and sockets, tending to return the lengths to position after strain, substantially as described.

3. A metal tube length for flexible piping, having at one end a socket grooved for packing and at the other end a journal materially smaller than the inside of the socket, whereby when a number of these are put together with intermediate packing a flexible piping with a certain amount of elasticity is provided, all substantially as described.

4. The improved flexible piping consisting of short tube lengths formed with socket ends and journal ends connected by pivots with packing-rings to make the joints fluid-tight and wire-gauze or other permeable diaphragm or lining combined with the packing, substantially as and for the purpose set forth.

5. Flexible piping consisting of short tube lengths formed with socket ends and journal ends connected together by pivot-pins and having a circular socket at the end, in combination with a pipe-nozzle having a bead and fitted into said circular socket, screws engaging behind the bead to hold the nozzle in place, and a packing-ring and wire-gauze in a groove in the socket to make a fluid-tight joint, all substantially as described.

In testimony whereof I have signed my name to this specification in the presence of two subscribing witnesses.

PHILIP C. LAWLESS.

Witnesses.
W. J. McTIGHE,
G. A. HILLEMANN.